H. E. LEONARD.
SHEET REGISTERING DEVICE.
APPLICATION FILED DEC. 15, 1917.
1,340,723.                    Patented May 18, 1920.
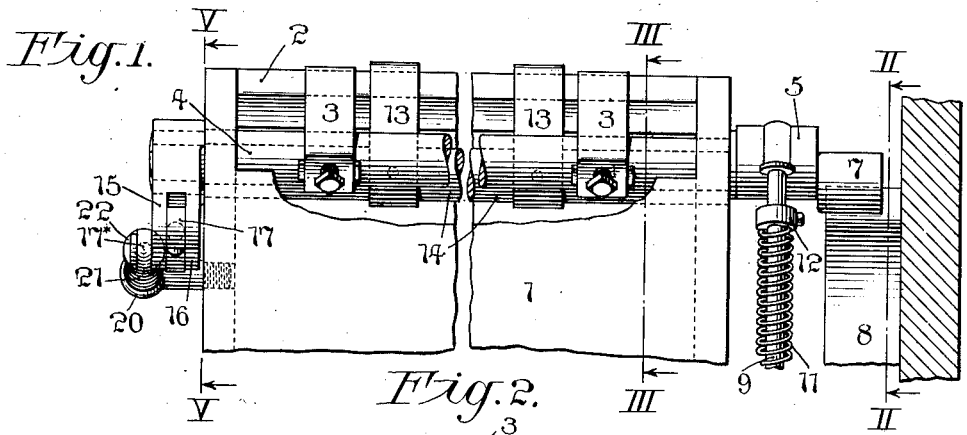
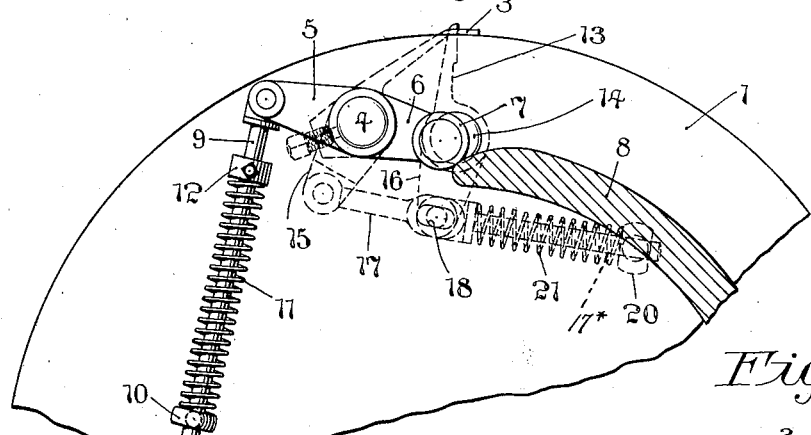
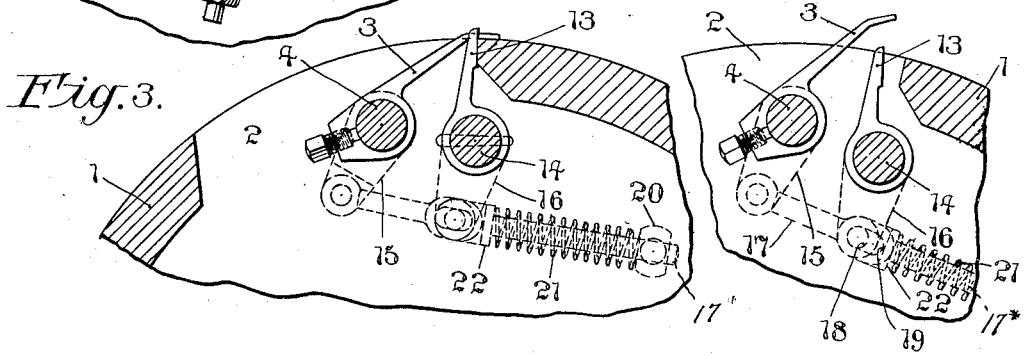
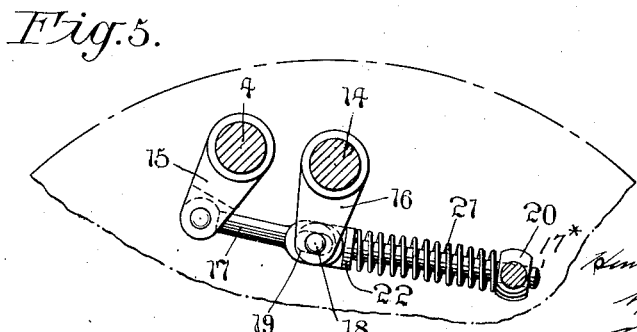
Inventor:
Henry E. Leonard
by attorneys

UNITED STATES PATENT OFFICE.

HENRY E. LEONARD, OF BROOKLYN, NEW YORK, ASSIGNOR TO C. B. COTTRELL & SONS COMPANY, OF NEW YORK, N. Y., A CORPORATION OF DELAWARE.

SHEET-REGISTERING DEVICE.

1,340,723.   Specification of Letters Patent.   Patented May 18, 1920.

Application filed December 15, 1917. Serial No. 207,339.

*To all whom it may concern:*

Be it known that I, HENRY E. LEONARD, a citizen of the United States, and resident of the borough of Brooklyn, in the city and State of New York, have invented a new and useful Improvement in Sheet-Registering Devices, of which the following is a specification.

The object of my invention is to provide novel means for registering sheets, which means include a rotary carrier having thereon sheet gripping and registering devices whereby the sheets may be registered on the carrier before the grippers close on the sheets; said devices being interconnected.

The gripping and registering devices are mounted upon separate axes, but preferably have a yielding lost motion connection so as to permit the grippers to close onto the sheets immediately after the registering fingers have reached the limit of their forward or registering movement.

A practical embodiment of my invention is represented in the accompanying drawings in which:

Figure 1 represents in front elevation so much of a sheet handling machine as will give a clear understanding of my invention.

Fig. 2 is a section taken in the plane of the line II—II of Fig. 1.

Fig. 3 is a section taken in the plane of the line III—III of Fig. 1.

Fig. 4 is a detail section similar to Fig. 3, with the grippers open and the registering fingers at the limit of their rearward movement, and Fig. 5 is a detail section taken in the plane of the line V—V of Fig. 1.

The rotary carrier is denoted by 1, and it is provided with the usual recess 2 for permitting the operation of the gripping and registering devices. The gripping device includes the set of grippers 3, fixed to their rod 4, which rod is mounted as usual in the ends of the rotary carrier 1, and is provided at one end of the carrier with a two-armed lever 5, 6, the arm 6 of which is provided with the usual stud or roller 7 in position to be engaged by the cam 8 for opening the grippers 3. The usual means are provided tending to close the grippers, such means including the rod 9 connected to the arm 5, sliding in the stud 10 and the coil spring 11 interposed between said stud 10 and the collar 12.

The registering device comprises the set of registering fingers 13 carried by the rod 14 suitably mounted in the ends of the rotary carrier. The registering device is connected to and operated from the gripping device, in the present instance by providing corresponding ends of the rods 4 and 14 with arms 15, 16, the arm 15 having a rod 17 provided with a yielding lost motion connection with the arm 16 through a pin 18 carried by said arm and an elongated slot 19 in the rod 17. A rod 17* is carried by the arm 16 and is slidable in the stud 20. A coil spring 21 is interposed between the said stud and a collar 22 fixed on the rod 17* for yieldingly holding the registering device at the limit of its forward or registering movement. This lost motion connection between the gripping and registering devices permits the grippers to close down onto the sheets immediately after the registering fingers have reached the sheets.

In operation, as the sheets are fed to the rotary carrier, the registering fingers 13 will be moved forwardly to properly engage the head ends of the sheets and register the same. The grippers which have been moved forwardly will then immediately close onto the sheets and hold them in register. It will thus be seen that means are provided on the rotary carrier for registering the sheets without stopping the movement of the sheets, thus materially facilitating the rapid handling of the sheets.

It is evident that various changes may be resorted to in the form, construction and arrangement of the several parts without departing from the spirit and scope of my invention, and hence I do not intend to limit myself to the structure herein shown and described, but

What I claim is:

1. A rotary sheet carrier and interconnected devices carried thereby rocking on different axes, operating to end register and grip the sheets.

2. A rotary sheet carrier and devices carried thereby rocking on different axes, operating to end register and grip the sheets, said devices having a lost motion connection.

3. A rotary sheet carrier and devices carried thereby rocking on different axes, operating to end register and grip the sheets, said devices having a yielding lost motion connection.

4. A rotary sheet carrier, grippers carried thereby rocking on one axis and a registering device for the sheets, rocking on a different axis, said registering device being operated by said grippers.

5. A rotary sheet carrier, grippers carried thereby rocking on one axis and a registering device for the sheets, rocking on a different axis, said registering device being operated by said grippers and having a lost motion connection therewith.

6. A rotary sheet carrier, grippers carried thereby rocking on one axis and a registering device for the sheets, rocking on a different axis, said registering device being operated by said grippers and having a yielding lost motion connection therewith.

7. A rotary sheet carrier, grippers carried thereby rocking on one axis and an end registering device for the sheets, rocking on a different axis, said registering device being operated by said grippers.

8. A rotary sheet carrier, grippers carried thereby rocking on one axis and an end registering device for the sheets, rocking on a different axis, said registering device being operated by said grippers and having a lost motion connection therewith.

9. A rotary sheet carrier, grippers carried thereby rocking on one axis and an end registering device for the sheets, rocking on a different axis, said registering device being operated by said grippers and having a yielding lost motion connection therewith.

10. A rotary sheet carrier, grippers carried thereby, their rocking rod, registering fingers and their rocking rod, said finger rod being connected to said gripper rod.

11. A rotary sheet carrier, grippers carried thereby, their rocking rod, registering fingers and their rocking rod, said finger rod having a lost motion connection with said gripper rod.

12. A rotary sheet carrier, grippers carried thereby, their rocking rod, registering fingers and their rocking rod, said finger rod having a yielding lost motion connection with said gripper rod.

13. A rotary sheet carrier, grippers carried thereby, their rocking rod, end registering fingers and their rocking rod, said finger rod being connected to said gripper rod.

14. A rotary sheet carrier, grippers carried thereby, their rocking rod, end registering fingers and their rocking rod, said finger rod having a lost motion connection with said gripper rod.

15. A rotary sheet carrier, grippers carried thereby, their rocking rod, end registering fingers and their rocking rod, said finger rod having a yielding lost motion connection with said gripper rod.

In testimony that I claim the foregoing as my invention I have signed my name this tenth day of December, 1917.

HENRY E. LEONARD.